United States Patent
Heflinger et al.

[11] 3,970,390
[45] *July 20, 1976

[54] MULTIFREQUENCY LASER OSCILLATOR FOR HOLOGRAPHIC CONTOURING

[75] Inventors: Lee O. Heflinger, Torrance; Ralph F. Wuerker, Palos Verdes Estates, both of Calif.

[73] Assignee: TRW Inc., Redondo Beach, Calif.

[ * ] Notice: The portion of the term of this patent subsequent to Sept. 7, 1988, has been disclaimed.

[22] Filed: Nov. 4, 1974

[21] Appl. No.: 520,600

Related U.S. Application Data
[62] Division of Ser. No. 310,859, Nov. 30, 1972, abandoned.

[52] U.S. Cl. ............................ 356/109; 331/94.5 C; 350/3.5
[51] Int. Cl.² ..................... G01B 9/025; H01S 3/10; G02B 27/00
[58] Field of Search ............... 356/2, 109; 350/3.5, 350/6; 331/94.5 C, 94.5 Q

[56] References Cited
UNITED STATES PATENTS

| | | | |
|---|---|---|---|
| 3,486,129 | 12/1969 | Van Tran et al. | 331/94.5 Q |
| 3,603,684 | 9/1971 | Wuerker | 356/109 |
| 3,603,685 | 9/1971 | Heflinger et al. | 356/109 |
| 3,707,687 | 12/1972 | Hercher et al. | 331/94.5 C |
| 3,743,965 | 7/1973 | Offner | 331/94.5 C |

FOREIGN PATENTS OR APPLICATIONS

| | | | |
|---|---|---|---|
| 1,050,561 | 12/1966 | United Kingdom | 356/229 |

*Primary Examiner*—John A. Corbin
*Assistant Examiner*—Wm. H. Punter
*Attorney, Agent, or Firm*—Daniel T. Anderson; Donald R. Nyhagen; Edwin A. Oser

[57] ABSTRACT

A multifrequency laser oscillator which generates coherent light of two closely adjacent optical frequencies in rapid succession for recording contour holograms by the double exposure technique. The two light frequencies are selected by an optical intercavity frequency selector which is rotatable to a first position to select one frequency and to a second position to select the other frequency. The described laser oscillators have a ruby lasing medium and lase at the $R_1$ and $R_2$ transitions of the ruby resonant fluorescence.

5 Claims, 3 Drawing Figures

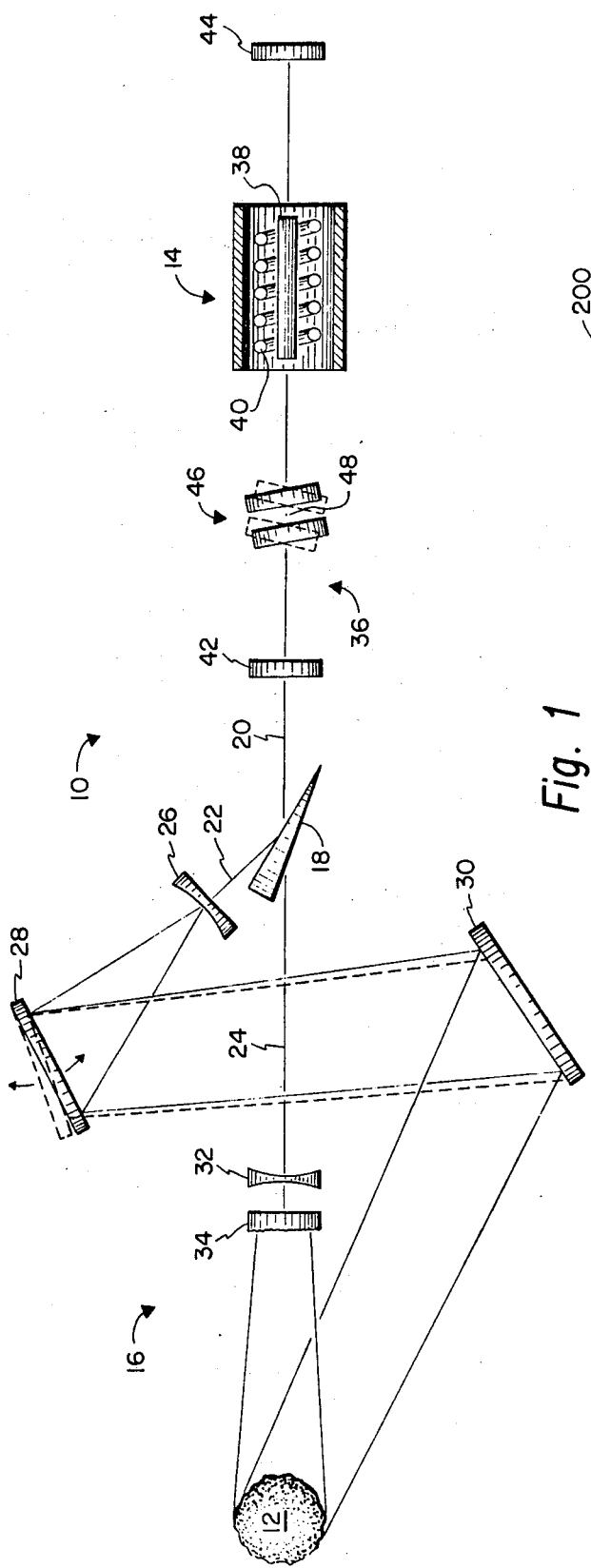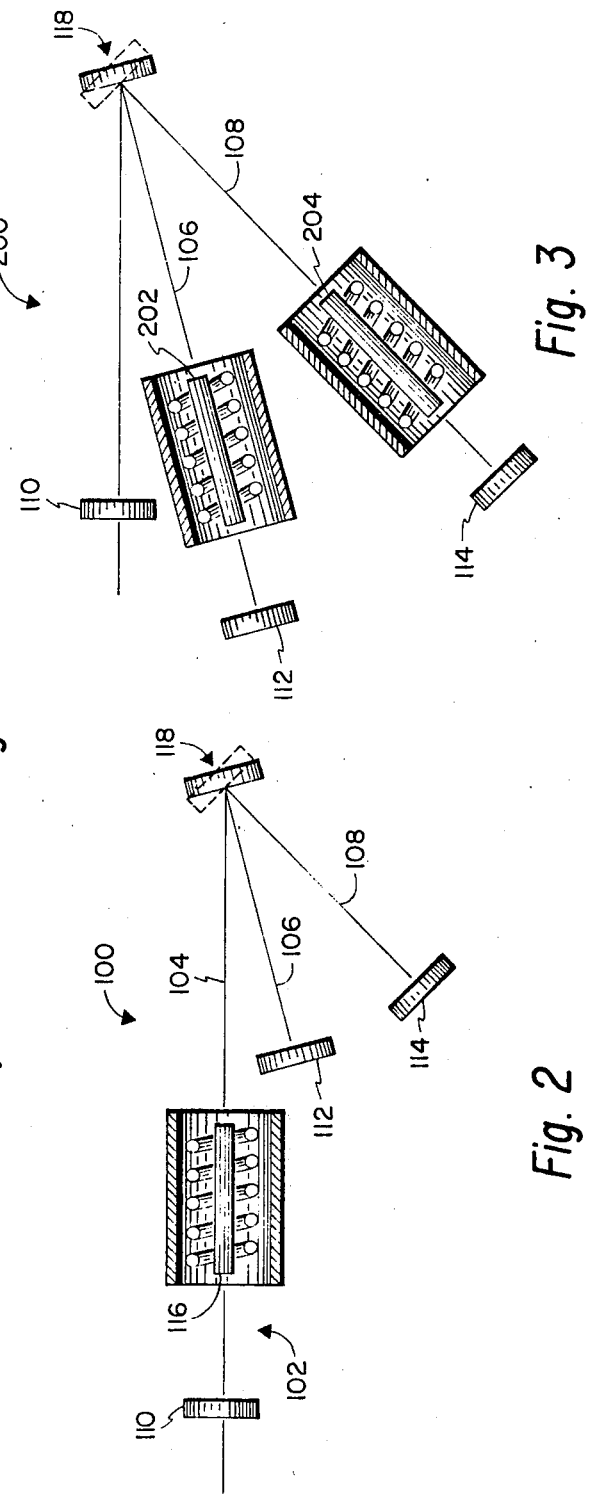

MULTIFREQUENCY LASER OSCILLATOR FOR HOLOGRAPHIC CONTOURING

RELATED APPLICATIONS

The present U.S. patent application is related to copending applications of Ralph F. Wuerker and Lee O. Heflinger, filed concurrently with now issued U.S. Pat. No. 3,820,062, entitled "Multifrequency Laser Oscillator for Holographic Contouring", and now issued U.S. Pat. No. 3,828,274, entitled "Polarized Multifrequency Laser Oscillator for Holographic Contouring" and assigned to TRW Inc. This is a division of application Ser. No. 310,859, filed Nov. 30, 1972, now abandoned.

BACKGROUND OF THE INVENTION

1. Field of the Invention

This invention relates generally to the field of holography and more particularly to a novel multifrequency laser oscillator which generates coherent light of two closely adjacent optical frequencies by rapid succession for recording contour holograms by the double exposure technique.

2. Prior Art

As is well known to those versed in the art of holography, holographic contouring involves recording a hologram of an object in such a way that the holographic image reconstructed from the hologram displays dark contour lines or bands, commonly referred to as contour fringes, from which the surface contour of the object may be determined with relatively high accuracy. The basic underlying principles of holographic contouring and the mechanics of implementing these principles are known and described in the open literature. For example, the basic principles of holographic contouring and holographic contouring apparatus are described in U.S. Pat. Nos. 3,603,684 and 3,683,685. Accordingly, it is unnecessary to elaborate on the basic principles of contouring in this disclosure.

Suffice it to say that holographic contouring involves holographically recording an object at two different holographic recording medium. The recordings produced by the two frequencies create an interference pattern in the reconstructed holographic image which produces the contour fringes. As discussed in the above mentioned patents, the contour fringe spacing is a function of the difference between the wavelengths of the two coherent light frequencies.

These patents also discuss the fact that a contour hologram may be recorded on a recording medium by a single exposure of the medium at both wavelengths of coherent light simultaneously or by double exposure of the medium, i.e. exposure of the recording medium first at one coherent light frequency and then at the other light frequency. In the single exposure technique, the two light frequencies are generated simultaneously and recorded simultaneously on the recording medium. In the double exposure technique, the two light frequencies are generated and recorded separately on the recording medium. The two methods produce the same contour fringe pattern. This invention is concerned with the double exposure technique.

When utilizing the double exposure technique to record a contour hologram, it is imperative that the object being recorded remain absolutely stationary between the successive exposures; that is to say, the object must remain stationary within a fraction of a wavelength of the coherent light. Accordingly, the double exposure technique is limited in application. Moreover, even in those applications for which the double exposure technique is suitable, the time interval between the successive exposures should be as brief as possible to minimize the possibility of movement of the object between exposures.

While this requirement that the object being recorded remain absolutely stationary between exposures restricts the useful applications of the double exposure contouring technique, the latter has a compensating advantage over the single exposure technique. This advantage stems from the fact that maximum contouring accuracy, and in some cases even the creation of contour fringes, may require different reference beam angles for the two light frequencies.

The single exposure technique presents the difficult task of separating the two frequency components of the single output beam from the coherent light source to provide separate reference beams of these two frequencies, respectively, which may then be directed to the recording medium at the correct interference beam angles. The double exposure technique avoids this problem since the two coherent light frequencies are automatically separated in time, and the holographic optics may be adjusted between exposures to obtain the correct reference beam angle for each frequency.

It is significant to note in connection with this reference beam angle requirement, that if the difference between the two coherent light frequencies is sufficiently small, satisfactory contour holograms may be recorded with the same reference beam angle for both light frequencies. The present invention is described in connection with contour hologram recording utilizing the $R_1$ and $R_2$ transitions or wavelengths of the resonant fluorescence of a ruby lasing medium. The frequency difference between these transitions is not sufficiently small to permit the use of the same reference beam angle for both frequencies.

From the discussion to this point, it is apparent that the single and double exposure techniques of recording contour holograms require different types of coherent light sources. Thus, the single exposure technique requires a coherent light source capable of generating two selected optical light frequencies simultaneously. The double exposure technique, on the other hand, requires a coherent light source capable of generating the two light frequencies individually, in rapid succession. In earlier mentioned U.S. Pat. Nos. 3,603,684 and 3,603,685, as well as U.S. Pat. No. 3,492,600, describe coherent light sources of these two different types.

SUMMARY OF THE INVENTION

This invention provides a multifrequency coherent light source or laser oscillator which generates coherent light of two closely adjacent optical frequencies in rapid succession for recording contour holograms by the double exposure technique. To this end, the laser oscillator has an optical resonator cavity containing active lasing means capable of lasing at each of the two light frequencies. The optical cavity includes optical frequency selecting means including an intercavity frequency selector for selecting, that is inducing lasing of the lasing medium at, these two light frequencies in rapid succession. The frequency selector is rotatable between a first position where it selects one of the frequencies and a second position where it selects the other frequency. The frequency selector may be rapidly rotated from one of these positions to the other to effect generation of the two light frequencies in rapid succession for recording contour holograms by the double exposure technique.

Several different forms of the laser oscillator are described. One described oscillator has a linear resonator cavity with conventional output and rear end reflectors. The optical frequency selector of this oscillator is a tuned transmission etalon located between the lasing medium and one cavity reflector and rotatable between first and second positions about an axis transverse to the longitudinal axis of the cavity. The etalon is so tuned that in one position it transmits substantially only light of one of the frequencies selected for contour hologram recording and reflects other frequencies from the cavity to induce lasing of the lasing medium at the selected frequency. In its other position, the etalon transmits substantially only light of the other frequency selected for recording and reflects other frequencies from the cavity to induce lasing at the other selcted frequency.

The other described laser oscillators of the invention have a Y cavity with an output reflector located in one of the three cavity legs. For convenience, the cavity leg containing the output reflector is referred to herein as the front leg and the two remaining cavity legs are referred to as rear legs. The frequency selector of these oscillators is a rotatable optical element, such as a mirror, located at the juncture of the cavity legs. The lasing means of one oscillator is a lasing medium located in the front cavity leg. The remaining rear cavity legs contain rear frequency selecting reflectors for selecting the two light frequencies, respectively, to be used for recording contour holograms.

The frequency selector is rotatable to a first position where it directs the laser beam to one rear reflector to induce lasing of the lasing medium at the frequency selected by this rear reflector. The frequency selector is rotatable to a second position where it directs the beam to the other rear reflector to induce lasing of the medium at the frequency selected by the latter reflector.

In the other described laser oscillator, with a Y cavity, the single lasing medium in the laser oscillator just discussed is replaced by separate lasing media in the two rear cavity legs. These lasing media lase at the two frequencies, respectively, selected for recording contour holograms. In one position of the rotary frequency selector, it directs the beam from one lasing medium to the output reflector to provide coherent light of one frequency and in the other position directs the beam from the other medium to the output reflector to produce coherent light of the other frequency.

BRIEF DESCRIPTION OF THE DRAWINGS

FIG. 1 illustrates holographic contouring apparatus embodying a multifrequency laser oscillator according to the invention;

FIG. 2 illustrates a modified multifrequency oscillator according to the invention; and FIG. 3 illustrates a further modified laser oscillator according to the invention.

DESCRIPTION OF THE PREFERRED EMBODIMENTS

Referring first to FIG. 1, there is illustrated a holographic contouring apparatus 10 for recording contour holograms of an object 12. Contouring apparatus 10 includes a laser oscillator 14 according to this invention and conventional holographic optics 16. Laser oscillator 14 will be described in detail presently. Suffice it to say at this point that the laser oscillator generates coherent light of two different selected optical frequencies and wavelengths in rapid succession.

The optics 16 of the holographic contouring apparatus 10 may comprise any holographic optical arrangement suitable for recording contour holograms. The particular optics illustrated include a beam splitter 18 located in the path of the output beam 20 from the laser oscillator 14. This beam splitter splits the output beam into a reference beam 22 and a scene beam 24. The reference beam passes through a negative lens 26 to a front surface mirror 28 and is then reflected back to a light-sensitive recording medium 30, such as a photographic film or plate or sheet of photochromic material. The reference beam should be enlarged by the negative lens 26 sufficiently to illuminate the entire surface of the recording medium 30 on which a contour hologram is to be recorded.

The scene beam 24 passes through a negative lens 32 and diffuser 34 to the object 12 to be recorded. The negative lens 32 should enlarge the beam sufficiently to illuminate the entire portion of the object to be mapped. The diffuser preferably is so constructed that the apparent light source does not appear too large. In other words, light diffuser should be preferentially scatter in the forward direction. Such a light diffuser may readily be obtained by a ground glass diffuser having a thin coating of a lacquer with substantially the same index of refraction as that of the glass of the diffuser. The light of the scene beam incident on the object 12 is scattered and reflected back to the recording medium 30.

In operation of the holographic contouring apparatus 10, the laser oscillator 14 is first operated to generate a coherent output beam 20 of one selected optical frequency and wavelength. The recording medium 30 is thereby exposed by the reference and scene beams 22, 24 of this frequency to produce a first holographic recording of the object 12 on the recording medium. Thereafter, the laser oscillator is operated to generate an output beam of another selected optical frequency and wavelength and thereby produce on the recording medium a second holographic recording of the object. The resulting double exposed holographic recording constitutes a contour hologram which may be reconstructed with a reference beam of one of the frequencies to produce a holographic contour image or map of the object 12 displaying contour fringes defining the surface contour of the object.

The basic principles of such holographic contouring were briefly explained earlier in this description and are discussed more fully in the earlier mentioned U.S. Pat. Nos. 3,603,684 and 3,603,685. Accordingly, it is unnecessary to elaborate on the matter at this point.

Laser oscillator 14 has an optical resonator cavity 36 containing an active lasing medium 38 capable of lasing at the two optical frequencies selected for holographic contouring. Means 40 are provided for pumping the medium to cause it to lase. The ends of the cavity are defined by a partially reflecting front output reflector 42 and a 99% rear end reflector 44.

Located between the lasing medium 38 and rear end reflector 44 is an optical frequency selector 46 for selecting, that is inducing the lasing medium 38 to lase at, the two optical frequencies to be used for recording contour holograms. In the particular laser oscillator illustrated in FIG. 1, this frequency selector is a transmission etalon. Etalon 46 is rotatably mounted in the cavity 36 to turn on an axis 48 normal to the axis of the cavity between its solid and broken line positions. As will be explained in more detail presently, operation of the laser oscillator 10 at the two optical frequencies selected for holographic contouring is accomplished by rotating etalon 46 between its two positions.

Before proceeding further with the operation of the laser oscillator, it is worthwhile to briefly discuss the lasing characteristics of a lasing medium. As is well known to those versed in the laser art and as also discussed in U.S. Pat. Nos. 3,603,684 and 3,603,685, a lasing medium has a lasing line width which represents the gain of the medium as a function of wavelength of frequency. It is also known to provide the optical cavity of a laser oscillator with mode selecting means which suppress oscillation at all but a selected frequency or selected frequencies within the lasing line width, such that the cavity has greater effective gain at the selected frequency or selected frequencies than at other frequencies. The lasing medium will lase at the transitions or frequencies at which the combined gain of the medium and the cavity exceeds the lasing threshold of the medium. In the laser art, this mode selecting action is commonly described as selecting the lasing transitions or frequencies of the lasing medium.

The present invention utilizes the intercavity etalon 46 to select the two lasing transitions or frequencies which are used for recording contour holograms. To this end, the etalon is tuned in a manner to be explained presently so that in one of its angular positions, it transmits substantially only light of one selected recording light frequency and reflects other light frequencies from the laser cavity 36. The combined gain of the lasing medium and effective gain of the etalon then exceeds the lasing threshold of the medium only at the selected frequency, and the medium lases at this frequency. In its other angular position, the etalon transmits substantially only light of the other selected recording frequency and reflects other light frequencies from the cavity. Under these conditions, the combined gain of the lasing medium and effective gain of the etalon again exceeds the lasing threshold only at the latter selected frequency, and the medium thus lases at this latter frequency.

These two recording frequencies are selected to yield the desired contour fringe spacing in the reconstructed holographic contour image or map. In this regard, attention is again directed to U.S. Pat. Nos. 3,603,684 and 3,603,685 which explain the relationship between recording frequency or wavelength and contour fringe spacing.

It will now be understood that when the laser oscillator 10 is operated with intercavity etalon 46 in its solid line position, the lasing medium 38 lases at one selected recording frequency to produce a first holographic recording of the object 12 on the recording medium 30. When the laser oscillator 10 is operated with etalon 46 in its broken line position, the lasing medium 38 lases at the other selected recording frequency to produce a second holographic recording of the object 12 on the recording medium 30.

As noted earlier, the object 12 must remain stationary within a fraction of a wavelength of the coherent light between the two exposures of the recording medium 30. Rotation of the etalon 46 between its two recording positions may be effected at a relatively high speed to minimize the possibility of movement of the object between exposures.

It will be apparent to those versed in the art that the present concept of controlling and rapidly changing the coherent light output frequency and wavelength may be utilized with a variety of lasing media, such as those mentioned in the earlier referenced patents.

The particular laser oscillator shown has a pink ruby lasing medium 38 with chromium ions dissolved, with a concentration on the order of 0.03% to 0.05% in a sapphire ($Al_2O_3$) host.

Ruby both fluoresces and absorbs in the red end of the visible spectrum. The fluorescence and resonance absorption is a doublet of 15 Anstroms separation. The longer wavelength line is now known as the $R_1$ line while the shorter wavelength line is the $R_2$ line. The red fluorescent doublet is a byproduct of the absorption of light in the blue and green portions of the spectra. The fluorescence is extremely efficient ($\sim 0.8$), with the result that nearly every excited atom decays via fluorescence.

The fluorescent lifetime of ruby is 3.8 milliseconds. The property of simultaneous absorption and fluorescence at the same wavelength classifies ruby as a three-level laser material.

Ruby laser crystals absorb resonance or fluorescence light according to the following expression, namely, $$I_t = I_o \exp(N_1 - N_2)\sigma l,$$

where $I_t$ is the intensity of light transmitted through a crystal of thickness $l$, (watts)

$I_o$ is the intensity of light incident on the crystal, (watts)

$N_1$ is the number of unexcited or ground state atoms per uni volume, (unexcited atoms per unit volume)

$N_2$ is the number of excited ($R_1$ or $R_2$ atoms) per unit volume, (excited atoms per unit volume)

$\sigma$ is the cross-section for the absorption and emission of radiation and $l$ is the physical length of the sample.

In the unexcited state, all of the atoms of a crystal are in the ground state and the crystal is absorptive of light resonant to either the $R_1$ or $R_2$ transitions. Under high excitation due to an intense flash of blue-green light, the number of atoms in the upper state can briefly exceed the number in the lower state. The crystal is no longer an absorber of resonance radiation, but instead has gain. When an optical resonator is added, the combination oscillates at the longitudinal modes of the resonator.

With an optical resonator with conventional broadband reflectors, ruby lasers emit or oscillate at wavelengths permitted by the $R_1$ fluorescent line width. Oscillation at the $R_2$ wavelength does not normally occur. However, oscillation at the $R_2$ wavelength can be achieved by thwarting the gain at the $R_1$ wavelength. The reason why rubies normally oscillate at the wavelength of the $R_1$ energy level is that this level is below the $R_2$ level and is more densely populated (by thermodynamic equilibrium arguments). The $R_2$ and $R_1$ levels are connected so that $R_1$ population is maintained from the $R_2$ level.

According to the present invention, the intercavity etalon 46 is turned to select the $R_1$ and $R_2$ transitions or wavelengths of the ruby 38. That is to say, the etalon is tuned to transmit substantially only the $R_1$ wavelength and thereby cause lasing of the ruby at this wavelength in one angular position of the etalon and to transmit substantially only the $R_2$ wavelength and thereby cause lasing of the ruby at this wavelength in the other angular position of the etalon.

Etalon 46 may be constructed from a pair of standard dielectric coated laser reflectors with broadband reflecting surfaces. From the well known Fabry-Perot resonance condition $m\lambda = 2T$:

T is the distance or optical thickness between reflecting surfaces,
m is an integer, and
$\lambda$ is the light wavelength, it follows that the separation of the reflecting surfaces can be chosen so that one wavelength $\lambda_2$ is intermediate the resonances of another wavelength $\lambda_1$.

The wavelength separation between the $\lambda_1$ resonances of the etalon is $$\Delta\lambda_1 = \frac{-\lambda_1^2}{2T}$$

where T is the separation.

For the $\lambda_2$ wavelength to be intermediate these two resonances, $$\lambda_1 = \lambda_2 + \frac{\Delta\lambda_1}{2} = \lambda_2 - \frac{\lambda_1^2}{4T}$$

Solving gives a surface spacing of $$T = \frac{\lambda_1^2}{4(\lambda_1 - \lambda_2)} \simeq \frac{\lambda^2}{4\Delta\lambda}$$

which puts the $\lambda_2$ resonances intermediate the $\lambda_1$ resonances. Substituting the room temperature wavelength values for the $R_1$ and $R_2$ wavelengths gives a surface separation L $$L = \frac{0.48}{4(15)} CM = 80 \text{ microns} = 0.0314 \text{ inches.}$$

Etalon 46, when thus tuned, is rotatable to a first angular position in which it transmits the $R_1$ wavelength of the ruby 38 to cause lasing at this wavelength and to a second angular position in which the etalon transmits the $R_2$ wavelength to cause lasing at the latter wavelength.

The holographic contouring apparatus 10 illustrated in FIG. 1 is thus operable to record a contour hologram of the object 12 by first operating the laser oscillator 14 with the intercavity etalon 46 set at its $R_1$ angle to expose the recording medium 30 at the $R_1$ wavelength. The etalon is then rotated to its $R_2$ angle to expose the recording medium at the $R_2$ wavelength. The resulting double exposed hologram may be used to reconstruct a holographic contour image or map of the object. The contour fringe spacing of this image or map is a function of the difference between the $R_1$ and $R_2$ wavelengths and is on the order of 172 microns.

As noted earlier, maximum contouring accuracy requires the proper reference beam angle for each light wavelength used to record the contour hologram. The relationship between wavelength and reference beam angle is well known to those versed in the holographic contouring art and need not be explained here. Suffice it to say that if the difference in the light frequencies used for recording a contour hologram is sufficiently great to require adjustment of the reference beam angle between successive exposures of the recording medium 30 at the two frequencies, such adjustment may be effected in any convenient way. In the particular holographic contouring apparatus illustrated, a reference beam angle adjustment is necessary owing to the difference between the $R_1$ and $R_2$ wavelengths used. This adjustment is made by adjusting mirror 28, as shown.

Holographic contouring apparatus according to the invention was constructed and successfully operated to produce contour holograms of an object and then reconstruct holographic contour maps of the object. The laser oscillator utilized a transmission etalon which was tuned in the manner explained earlier.

Reference is now made to the modified multifrequency laser oscillator 100 of FIG. 2. This laser oscillator may be used in the holographic contouring apparatus of FIG. 1 in place of the laser oscillator 14. Laser oscillator 100 has an optical resonator cavity 102 which is essentially a Y cavity since it has three intersecting portions or legs 104, 106, and 108. For convenience, leg 104 is referred to as a front leg. Legs 106, 108 are referred to as rear legs. The front end of the cavity 102 is defined by a partially reflecting output reflector 110 in the front cavity leg 104. The rear end of the cavity is defined by a pair of reflectors 112, 114 within the rear cavity legs 106, 108, respectively.

Within the front leg 104 of the resonator cavity 102 is an active lasing medium 116 capable of lasing at the two optical frequencies selected for recording contour holograms. The two rear cavity reflectors 112, 114 are designed to select these two frequencies. The illustrated lasing medium is a ruby which lases at the $R_1$ and $R_2$ transitions or wavelengths, as described earlier in connection with FIG. 1. The rear cavity reflectors may be those described in connection with FIG. 1 and select the $R_1$ and $R_2$ transitions, respectively.

Laser oscillator 100 has a rotary frequency selector 118 located at the juncture of the three cavity legs 104, 106, and 108. This frequency selector is an optical element which is rotatable to its solid line position where it directs the coherent light beam from the lasing medium or ruby 116 to the rear $R_1$ cavity reflector 112 and to its broken line position where it directs the beam to the rear $R_2$ cavity reflector 114. The illustrated frequency selector is a front surface mirror.

In operation of the laser oscillator 100, the lasing medium 116 is pumped concurrently with rotation of the frequency selector 118 from one position to the other. When the frequency selector occupies its solid line position, the laser beam reflects from the rear cavity reflector 112 which selects the $R_1$ transition of the ruby 116 to cause the laser oscillator to generate coherent light of the $R_1$ wavelength. When the frequency selector occupies its broken line position, the laser beam reflects from the rear cavity reflector 114 which selects the $R_2$ transition of the ruby to cause the laser oscillator to generate coherent light of the $R_2$ wavelength. This rotation of the frequency selector may be accomplished rapidly to effect generation of the $R_1$ and $R_2$ wavelengths in rapid succession, whereby the laser oscillator may be used in the holographic contouring apparatus of FIG. 1 to record contour holograms.

The further modified laser oscillator 200 of FIG. 3 is identical to that of FIG. 2 except that the single lasing medium 116 of the latter oscillator is replaced, in the oscillator 200 by a pair of lasing media or rubies 202, 204 within the rear legs 106, 108 of the Y resonator cavity 102. These rubies are pumped concurrently with rotation of the frequency selector 118 from its solid line position to its broken line position. When the frequency selector occupies its solid line position, it directs the coherent light beam from the ruby 202 to the output reflector 110 to effect lasin of the ruby at the $R_1$ wavelength selected by the rear cavity reflector 112. When the frequency selector occupies its broken line position, it directs the coherent light beam from ruby 204 to the output reflector to effect lasing of the ruby at the $R_2$ wavelength. Laser oscillator 200 like the oscillator 100 may be used in the holographic contouring apparatus of FIG. 1 to record contour holograms.

What is claimed as new in support of Letters Patent is:

1. Double exposure holographic contouring apparatus comprising:
    a multifrequency laser oscillator comprising means forming an optical cavity including a rear end reflector and a front end output reflector, active lasing means in said cavity between said reflectors capable of lasing at two different optical frequencies; means for pumping said lasing means; frequency selecting means for causing said lasing means to lase at said frequencies in rapid succession comprising a transmission etalon in said cavity between said lasing means and one end reflector which is rotatable between first and second positions and is turned to select said first frequency in said first position and said second frequency in said second position;
    a beam splitter for splitting the output beam from said laser oscillator into a reference beam and a scene beam;
    light-sensitive means disposed in a predetermined plane for recording a hologram of an object;
    first fixed optical means for directing said reference beam toward said light-sensitive means; and
    second optical means for directing said scene beam onto the object to be recorded and thence onto said light-sensitive means, the difference in said frequencies being such that range contours of a predetermined spacing are produced on the object.

2. Holographic contouring apparatus according claim 1 wherein:
    said lasing means comprise ruby lasing means;
    said frequencies correspond to the $R_1$ and $R_2$ wavelengths, respectively of the resonant fluorescence of said ruby lasing means; and
    said frequency selector selects said $R_1$ wavelength in said first position and said $R_2$ wavelength in said second position.

3. Double exposure holographic contouring apparatus comprising:
    a multifrequency laser oscillator comprising active lasing means capable of lasing at two different optical frequencies, means for pumping said lasing means, frequency selecting means for causing said lasing means to lase at said frequencies in rapid succession comprising an optical cavity containing said lasing means and including an optical intercavity frequcney selector which is rotatable to a first position to select one of said lasing frequencies and to a second position to select the other lasing frequency;
    said optical cavity comprising a Y-cavity having an output reflector in a first leg of the cavity;
    said lasing means comprising a lasing medium in said cavity leg capable of lasing at each of said frequencies to produce a beam of coherent light of the corresponding frequency;
    said frequency selecting means comprising first and second rear end reflectors in the two remaining legs, respectively, of said cavity for selecting said first and second frequencies, respectively;
    said frequency selector comprising a rotary optical element at the juncture of said cavity legs for directing said beam between said lasing medium and said first rear end reflection in said first position and between said lasing medium and said second rear end reflector in said second position;
    a beam splitter for splitting the output beam from said laser oscillator into a reference beam and a scene beam;
    light-sensitive means disposed in a predetermined plane for recording a hologram of an object;
    first fixed optical means for directing said reference beam toward said light-sensitive means; and
    second optical means for directing said scene beam onto the object to be recorded and thence onto said light-sensitive means, the difference in said frequencies being such that range contours of a predetermined spacing are produced on the object.

4. Holographic contouring apparatus according to claim 3 wherein:
    said lasing medium is a ruby;
    said frequencies correspond to the $R_1$ and $R_2$ wavelengths, respectively, of the resonant fluorescence of said ruby; and
    said first rear end reflector selects said $R_1$ wavelength and said second rear end reflector selects said $R_2$ wavelength.

5. Holographic contouring apparatus according to claim 4 wherein:
    said optical element comprises a reflector.

* * * * *